Oct. 25, 1927.

G. W. GOODRIDGE 1,646,999

CHAIN ORNAMENT

Filed Sept. 14, 1922

INVENTOR
GILBERT W. GOODRIDGE
BY
ATTORNEYS.

Patented Oct. 25, 1927.

1,646,999

UNITED STATES PATENT OFFICE.

GILBERT W. GOODRIDGE, OF BRIDGEPORT, CONNECTICUT, ASSIGNOR TO THE BEAD CHAIN MANUFACTURING CO., OF BRIDGEPORT, CONNECTICUT, A CORPORATION OF CONNECTICUT.

CHAIN ORNAMENT.

Application filed September 14, 1922. Serial No. 588,178.

My invention relates to a chain ornament, and particularly to a chain girdle or the like. The object of my invention is to provide an ornament of this type comprising a group of chains having certain features of improved construction. The present application refers to the chain spacing device shown in the copending application of William J. Gagnon, Serial No. 543,525, filed March 13, 1922.

In the accompanying drawings—

Figure 1:
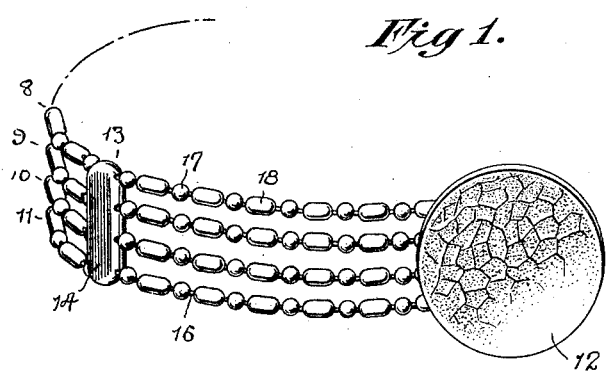
Fig. 1 is a perspective of portion of a girdle in which my invention is embodied in one form.

In the form here shown the girdle comprises a group of four chains, 8, 9, 10 and 11, although it will be understood that a greater or less number of chains may be employed, and that appropriate modifications of the construction of the associated girdle elements may be made to accommodate the number of chains employed. At one end the girdle chains are secured to an anchor member of any suitable type, such, for example, as the ornamental medallion 12. At suitable points, spaced around the length of the girdle, are spacer bars, generally indicated by the reference number 13, Fig. 1, which serve to maintain the chains properly spaced apart. The size of the spacer bars is customarily uniform around the length of the girdle, but they may be of greater or less size, for example where it is desired to expand the girdle at one point and contract it at another point. The spacer bar may also be of various shapes, and may be ornamented if desired, as, for example, by longitudinal serrations 14.

Figure 2:
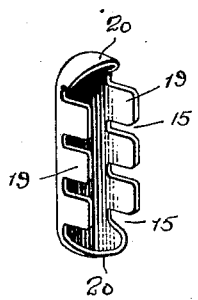
Fig. 2 is a perspective of the cupped blank for one of the spacing bars.
Figure 3:
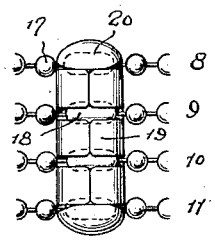
Fig. 3 is a face view thereof showing the spacing bar assembled with the girdle chains.

In the construction illustrated the spacer bar is of substantially rectangular contour with rounded ends, and is struck from sheet metal and formed to the cup-shaped blank illustrated in Fig. 2 in readiness for assembly with the chains. Its side walls are notched at 15 to accommodate the links 16 which connect adjacent ball members of the chain. In the chain illustrated, the ball members are alternately spherical, 17, and elliptical, 18, but it will be understood that the particular shape of the ball members may be varied as desired to impart an ornamental configuration to the chain elements. The width of the spacer is, in the present instance, sufficient to accommodate one of the elliptical ball members 18 between the sides of the spacer, but this dimension of the spacer may be varied as desired. In any event, the slots 15 are of such width that the adjacent fingers 19 formed thereby in the sides of the bar, are spaced apart a less distance than the diameter of the ball member which is engaged by the spacer. Consequently, when the fingers of the blank are closed upon the ball element 18, or the like, the latter is held against escape through the slots 15.

At the ends of the spacer are lugs 20, which, in assembled position, are also turned or folded down to cooperate with the adjacent side fingers 19 to close in the ball members 18 of the top and bottom chains 8 and 11, and prevent their endwise escape from the spacer bar.

The construction illustrated is readily formed from sheet metal and affords a simple and efficient spacing device for the purpose set forth. Various modifications in contour and details of construction will readily occur to those skilled in the art, without departing from what I claim as my invention.

I claim—

1. In a chain ornament, a group of chains extending in the same general direction, each having elements of relatively greater and reduced diameter and a spacing bar extending transversely of the chain group, said bar comprising a cupped member having its sides slotted at spaced intervals to receive elements of reduced diameter in the several spaced chains, and forming fingers which confine within the bar, elements of greater diameter in the several chains.

2. In a chain ornament, a group of chains, comprising alternate ball and link elements, in combination with a spacing bar extending transversely of the chain group, said bar comprising a cupped member having its sides slotted at spaced intervals to receive links of the several chains of the group, and forming fingers which confine within the spacing bar an adjacent ball member of each chain.

3. In a chain ornament comprising a group of transversely spaced chains formed from balls interconnected by links, a sheet metal spacing bar adapted to extend transversely of the chain group, and having at its side a series of fingers adapted to be bent over ball elements of the several chains, said fingers being spaced apart sufficiently to accommodate between them said chain links extending between adjacent ball elements of the several chains.

4. In a chain ornament comprising a series of laterally spaced chains formed from balls interconnected by links, a sheet metal spacing bar having end and side fingers adapted to be folded over the ball elements of the several chains, said fingers being spaced apart to accommodate between them said links extending between the adjacent ball elements of the several chains.

5. In a chain ornament, a group of chains extending in the same general direction and comprising alternate ball and link elements, in combination with a sheet metal spacing bar extending transversely of the chain group and having a side flange slotted to form a series of spaced retaining fingers adapted to be bent over ball members of the several chains engaged by the bar, the space between said fingers being less than the diameter of said ball elements but greater than the diameter of the link elements, and serving, when closed upon the latter, to retain the same against escape while permitting play of the associated links in the spaces between adjacent fingers.

6. In a chain ornament, a group of chains each comprising ball elements interconnected by links, and a spacing bar extending transversely of the chain group and of greater length than the width of the chain group at the point at which the spacing bar is attached, said bar comprising bendable side and end fingers spaced apart to accommodate chain links therebetween, and serving when bent toward the bar to engage and confine ball elements of the several chains.

In testimony whereof I have signed my name to this specification.

GILBERT W. GOODRIDGE.